(12) United States Patent
Arumugam et al.

(10) Patent No.: US 11,570,097 B1
(45) Date of Patent: Jan. 31, 2023

(54) OVERLAY BROADCAST NETWORK FOR MANAGEMENT TRAFFIC

(71) Applicant: VMware, Inc., Palo Alto, CA (US)

(72) Inventors: Ganes Kumar Arumugam, Palo Alto, CA (US); Alex N. Tessmer, Sun Prairie, WI (US); Harish Kanakaraju, Palo Alto, CA (US)

(73) Assignee: VMWARE, INC>, Palo Alto, CA (US)

( * ) Notice: Subject to any disclaimer, the term of this patent is extended or adjusted under 35 U.S.C. 154(b) by 12 days.

(21) Appl. No.: 17/382,431

(22) Filed: Jul. 22, 2021

(51) Int. Cl.
*H04L 45/64* (2022.01)
*H04L 45/02* (2022.01)
*H04L 45/586* (2022.01)
*H04L 12/46* (2006.01)

(52) U.S. Cl.
CPC .......... *H04L 45/64* (2013.01); *H04L 12/4633* (2013.01); *H04L 12/4641* (2013.01); *H04L 45/02* (2013.01); *H04L 45/04* (2013.01); *H04L 45/586* (2013.01)

(58) Field of Classification Search
CPC ......... H04L 45/64; H04L 45/02; H04L 45/04; H04L 45/586; H04L 12/4633; H04L 12/4641
See application file for complete search history.

(56) References Cited

U.S. PATENT DOCUMENTS

| | | | |
|---|---|---|---|
| 8,429,647 B2 | 4/2013 | Zhou et al. | |
| 11,394,647 B1* | 7/2022 | Manoharan | H04L 45/566 |
| 2020/0195509 A1* | 6/2020 | Singh | G06F 9/45533 |
| 2021/0092057 A1* | 3/2021 | Devireddy | H04L 45/02 |
| 2021/0385149 A1* | 12/2021 | Suryanarayana | H04L 49/25 |

OTHER PUBLICATIONS

U.S. Appl. No. 16/993,807, filed Aug. 14, 2020.
U.S. Appl. No. 16/893,170, filed Jun. 4, 2020.
U.S. Appl. No. 17/368,729, filed Jul. 6, 2021.
U.S. Appl. No. 17/368,745, filed Jul. 6, 2021.

* cited by examiner

*Primary Examiner* — Min Jung
(74) *Attorney, Agent, or Firm* — Patterson & Sheridan, LLP (57) ABSTRACT

The disclosure provides an approach for an overlay broadcast network for management traffic. Techniques are provided for updating an underlay network route for a virtual computing instance (VCI) on a new host. After activating the VCI on the new host, a routing table on the old host is reprogrammed to associate an Internet protocol (IP) address of the VCI to an overlay broadcast network IP address and a routing table on the new host is reprogramed to associate the first IP address to a local route on the new host. The VCI sends a message to an application programming interface (API) endpoint to initiate reprogramming of an underlay network route to associate the first IP address to the new host. When a response packet is received at the old host, via the underlay network, the old host broadcasts the packet to the overlay broadcast network.

20 Claims, 8 Drawing Sheets

FIG. 1A

| Routing Table 127a | |
|---|---|
| IP address | Routing Destination |
| 10.2.192.4/32 | 10.2.32.4 |
| 10.2.192.5/32 | 10.2.32.4 |
| 0.0.0.0/0 | 10.2.64.1 |
| Policy | Action |
| Rx on UL intf. & source is 54.46.23.45 | Drop |

| Routing Table 127b | |
|---|---|
| IP address | Routing Destination |
| 10.2.192.6/32 | 10.2.32.5 |
| 0.0.0.0/0 | 10.2.64.1 |
| Policy | Action |
| Rx on UL intf. & source is 54.46.23.45 | Drop |

| Routing Table 127c | |
|---|---|
| IP address | Routing Destination |
| 10.2.192.7/32 | 10.2.32.6 |
| 0.0.0.0/0 | 10.2.64.1 |
| Policy | Action |
| Rx on UL intf. & source is 54.46.23.45 | Drop |

| Routing Table 157 | |
|---|---|
| IP address | Routing Destination |
| 10.2.192.4/32 | 10.2.64.4 |
| 10.2.192.5/32 | 10.2.64.4 |
| 10.2.192.6/32 | 10.2.64.5 |
| 10.2.192.7/32 | 10.2.64.6 |
| 10.2.32.0/20 | Directly-conn. |
| 10.2.48.0/20 | Directly-conn. |
| 10.2.64.0/20 | Directly-conn. |
| 0.0.0.0/0 | ESG |

Routing Table 127c

| IP address | Routing Destination |
|---|---|
| _10.2.192.4/32_ | _10.2.32.6_ |
| 10.2.192.7/32 | 10.2.32.6 |
| 0.0.0.0/0 | 10.2.64.1 |
| Policy | Action |
| Rx on UL intf. & source is 54.46.23.45 | Drop |

Routing Table 127b

| IP address | Routing Destination |
|---|---|
| 10.2.192.6/32 | 10.2.32.5 |
| 0.0.0.0/0 | 10.2.64.1 |
| Policy | Action |
| Rx on UL intf. & source is 54.46.23.45 | Drop |

Routing Table 157

| IP address | Routing Destination |
|---|---|
| 10.2.192.4/32 | 10.2.64.4 |
| 10.2.192.5/32 | 10.2.64.4 |
| 10.2.192.6/32 | 10.2.64.5 |
| 10.2.192.7/32 | 10.2.64.6 |
| 10.2.32.0/20 | Directly-conn. |
| 10.2.48.0/20 | Directly-conn. |
| 10.2.64.0/20 | Directly-conn. |
| 0.0.0.0/0 | ESG |

Routing Table 127a

| IP address | Routing Destination |
|---|---|
| 10.2.192.4/32 | _100.64.10.1_ |
| 10.2.192.5/32 | 10.2.32.4 |
| 0.0.0.0/0 | 10.2.64.1 |
| Policy | Action |
| Rx on UL intf. & source is 54.46.23.45 | Drop |

FIG. 2B

| Routing Table 127c | |
|---|---|
| IP address | Routing Destination |
| 10.2.192.4/32 | 10.2.32.6 |
| 10.2.192.7/32 | 10.2.32.6 |
| 0.0.0.0/0 | 10.2.64.1 |
| Policy | Action |
| Rx on UL intf. & source is 54.46.23.45 | Drop |

| Routing Table 127b | |
|---|---|
| IP address | Routing Destination |
| 10.2.192.6/32 | 10.2.32.5 |
| 0.0.0.0/0 | 10.2.64.1 |
| Policy | Action |
| Rx on UL intf. & source is 54.46.23.45 | Drop |

| Routing Table 157 | |
|---|---|
| IP address | Routing Destination |
| 10.2.192.4/32 | *10.2.64.6* |
| 10.2.192.5/32 | 10.2.64.4 |
| 10.2.192.6/32 | 10.2.64.5 |
| 10.2.192.7/32 | 10.2.64.6 |
| 10.2.32.0/20 | Directly-conn. |
| 10.2.48.0/20 | Directly-conn. |
| 10.2.64.0/20 | Directly-conn. |
| 0.0.0.0/0 | ESG |

| Routing Table 127a | |
|---|---|
| IP address | Routing Destination |
| 10.2.192.5/32 | 10.2.32.4 |
| 0.0.0.0/0 | 10.2.64.1 |
| Policy | Action |
| Rx on UL intf. & source is 54.46.23.45 | Drop |

OVERLAY BROADCAST NETWORK FOR MANAGEMENT TRAFFIC

BACKGROUND

In a cloud data center, a cloud provider may provide a network layer, such as Layer 3 (L3) connectivity via a physical network, which may be referred to as an underlay network. Hosts may be connected via the underlay network. Workload virtual machines (VMs) running on the hosts can communicate with each other using an overlay network established by hosts using a tunneling protocol as described in further detail below. Management and other VMs that cannot be placed on overlay networks have Internet Protocol (IP) addresses that are directly addressable from the underlay (also referred to as "underlay addressable VMs"). Their IP addresses may be programmed in an underlay routing table in the underlay network. Routers in the underlay use the routing table to route packets to a next hop. For example, the IP address of such a management VM that is addressable from the underlay may be bound to a network interface provided in the cloud data center by the cloud provider.

Network interfaces provided in a cloud data center may be referred to as host network interfaces (HNIs). Such HNIs may be software defined network interfaces. One or more IP addresses that are addressable on the underlay may be bound to an HNI, such that routers of the underlay are configured to route packets addressed to such IP addresses to the HNI. The HNI may be implemented on a particular host and, therefore, the routers of the underlay are configured to route packets addressed to such IP addresses of the HNI to the associated host. For example, the IP address of a management VM may be bound to the HNI of the host that runs the management VM.

Each underlay router has an underlay routing table programmed with routes. For example, an underlay routing table may include routes for IP addresses that point to HNIs associated with the IP addresses, as discussed. Accordingly, when a packet received at the underlay router has an IP address bound to a particular HNI, the packet is routed to the host associated with the HNI. The packet is then received at a virtual router running on the host, and routed based on the virtual router's routing table, such as to the underlay addressable VM running on the host.

When an underlay addressable VM moves from a source host to a destination host, the routes for IP address(es) of the underlay addressable VM need to be updated in virtual router routing tables on the overlay and in the underlay routing table to ensure that packets for the underlay addressable VM are properly routed in the data center. For example, the virtual router routing tables in both the source host and the destination host may need to be updated.

In certain aspects, an agent process running in the hypervisor of a host can update the virtual router routing table of the host, since the hypervisor is aware when a VM is added to the host or removed from the host, such as based on a port of the VM being added or deleted on a virtual switch of the host.

The programming of the underlay routes may be performed using an application programming interface (API) call to a cloud provider API endpoint (e.g., a cloud server) that manages the underlay for each route (e.g., each API call may take on the order of seconds between when the API call is received and the underlay routing tables updated). For example, a public cloud provider provides access to the cloud server that exposes an API that is used by hosts in the system to program routes in the underlay routing table. This can be achieved by a process running in a management VM that performs API calls to the cloud provider's API endpoint to update the underlay routes.

If a management VM itself moves to a different host, the management VM is responsible for updating the route for itself in the underlay routing table so it can communicate with the cloud provider API endpoint. However, the management VM may not be able to update the underlay routing table without first communicating with the cloud provider API endpoint.

Accordingly, techniques are needed for updating underlay routes for a management VM when the management VM moves to a different host.

SUMMARY

The technology described herein provides techniques for updating underlay routes for a management virtual machine (VM) when the management VM moves to a different host, such as in public cloud environments. Such techniques may similarly be applicable to any suitable underlay addressable virtual compute instance (VCI) configured to update underlay routing tables in a data center. A method of updating an underlay network route for a VCI moved from an old host to a new host in a data center generally includes, after activating the VCI on the new host, reprogramming a first routing table on the old host to associate a first Internet protocol (IP) address of the VCI with an overlay broadcast network IP address of an overlay broadcast network. The overlay broadcast network is implemented by a plurality of hosts prior to the activating of the VCI on the new host. The plurality of hosts includes the new host, the old host, and one or more other hosts. The method generally includes, after activating the VCI on the new host, reprogramming a second routing table on the new host to associate the first IP address to a local route on the new host and sending, from the VCI to an application programming interface (API) endpoint, a message to initiate reprogramming of an underlay network route in a routing table of an underlay network to associate the first IP address to a network interface of the new host. The method generally includes receiving from the underlay network, at the old host, a packet having a destination address corresponding to the first IP address. The packet may be a response packet from the API endpoint to the VCI. The method generally includes, based on the first routing table associating the first IP address with the overlay broadcast network IP address, broadcasting the packet to the new host and the one or more other hosts via the overlay broadcast network.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for forwarding management traffic on an overlay broadcast network, when a management virtual machine (VM) moves from a first host (referred to herein as the "old host" or "source host") to another host (referred to herein as the "new host" or "destination host"), thereby maintaining connectivity with a cloud provider application programming interface (API) endpoint to update a route for the management VM's Internet protocol (IP) address in an underlay routing table to associate the new host with the management VM's IP address. The overlay broadcast network may refer to a set of hosts in a data center that are addressable by an overlay broadcast network IP address, as further discussed herein. For example, the overlay broadcast network may include one or more hosts, such as all hosts, managed by a management plane (MP) including the management VM. The techniques discussed herein may similarly be applicable to any suitable underlay addressable VCI configured to update underlay routing tables in a data center.

When a management VM moves to a new host, and before the underlay routing table is updated, the underlay continues to route traffic for the management VM to the old host. According to technology described herein, instead of dropping the traffic, the old host forwards the traffic to the correct host using the overlay broadcast network. Further, in certain embodiments, a routing policy is used to prevent traffic looping. For example, based on the routing policy, traffic received via the overlay broadcast network at a host is dropped by the host if the management VM is not located on the host, instead of being routed back to the default route (e.g., the underlay network). In certain embodiments, the routing policy is configured to drop packets that: 1) are received at the host over an uplink, 2) have a source IP address associated with a source endpoint for which traffic is forwarded over the overlay broadcast network, and 3) have a destination IP address that is not on the host. An example of such a source endpoint may be a cloud provider API endpoint.

Figure 1A:
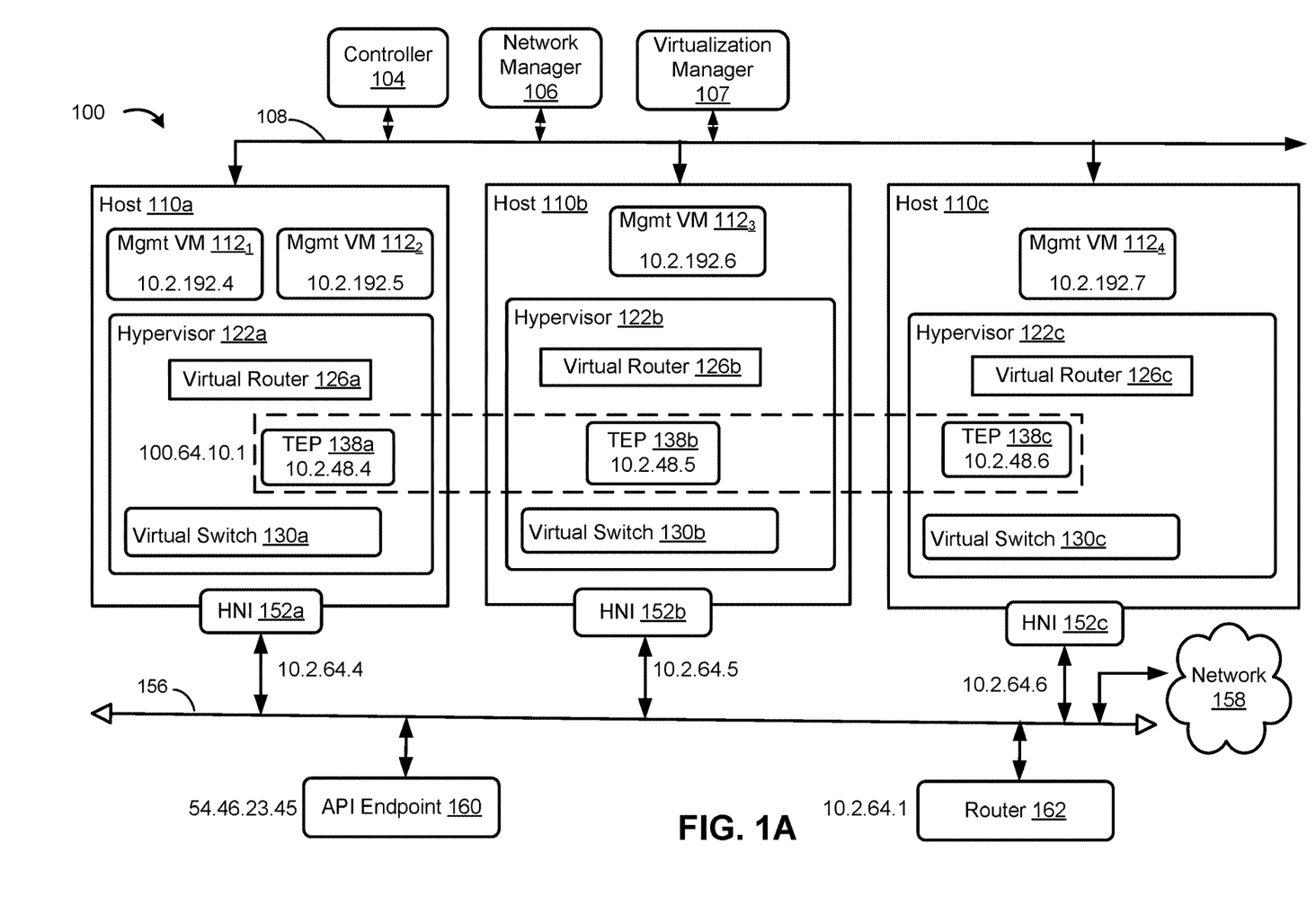
FIG. 1A depicts a block diagram of a first host with a first management VM, a second host, and a third host, connected to an underlay network, according to one or more embodiments.

FIG. 1A depicts example physical and virtual network components in a networking environment 100 in which embodiments of the present disclosure may be implemented. In some implementations, networking environment 100 is a public cloud environment. Networking environment 100 includes a set of networked computing entities, and may implement a logical overlay network. Networking environment 100 includes a data center and an external network 158, which may be a wide area network such as the Internet.

The data center includes hosts 110, a management network 108, a data network 156, a controller 104, a network manager 106, and a virtualization manager 107. Data network 156 and management network 108 may be implemented as separate physical networks or separate virtual local area networks (VLANs) on the same physical network. The data center includes a management plane (MP) and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane.

Network manager 106 receives network configuration input from an administrator and generates desired state data that specifies how a logical network should be implemented in the physical infrastructure of the data center. Network manager 106 may communicate with host(s) 110 via management network 108.

The control plane determines the logical overlay network topology and maintains information about network entities such as logical switches, logical routers, and endpoints, etc. The logical topology information is translated by the control plane into network configuration data that is then communicated to network elements of host(s) 110. Controller 104 generally represents a control plane that manages configuration of VCIs 112 within the data center. Controller 104 may be one of multiple controllers executing on various hosts in the data center that together implement the functions of the control plane in a distributed manner. Controller 104 may be a computer program that resides and executes in a central server in the data center or, alternatively, controller 104 may run as a virtual appliance (e.g., a VM) in one of hosts 110. Although shown as a single unit, it should be understood that controller 104 may be implemented as a distributed or clustered system. That is, controller 104 may include multiple servers or virtual computing instances that implement controller functions. Controller 104 collects and distributes information about the network from and to endpoints in the network. Controller 104 is associated with one or more virtual and/or physical CPUs (not shown). Processor(s) resources allotted or assigned to controller 104 may be unique to controller 104, or may be shared with other components of the data center. Controller 104 communicates with hosts 110 via management network 108. Controller 104 communicates with host(s) 110 via management network 108, such as through control plane protocols.

Network manager 106 and virtualization manager 107 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, network manager 106 is a computer program that executes in a central server in networking environment 100, or alternatively, network manager 106 may run in a VM, e.g. in one of hosts 110. Network manager 106 is configured to receive inputs from an administrator or other entity, e.g., via a web interface or API, and carry out administrative tasks for the data center, including centralized network management and providing an aggregated system view for a user.

In an embodiment, virtualization manager 107 is a computer program that executes in a central server in the data center (e.g., the same or a different server than the server on which network manager 106 executes), or alternatively, virtualization manager 107 runs in one of VCIs 112. Virtualization manager 107 is configured to carry out administrative tasks for the data center, including managing hosts 110, managing VCIs running within each host 110, provisioning VCIs, transferring VCIs from one host to another host, transferring VCIs between data centers, transferring application instances between VCIs or between hosts 110, and load balancing among hosts 110 within the data center. Virtualization manager 107 takes commands as to creation, migration, and deletion decisions of VCIs and application instances on the data center. However, virtualization manager 107 also makes independent decisions on management of local VCIs and application instances, such as placement of VCIs and application instances between hosts 110. One example of virtualization manager 107 is the vCenter Server™ product available from VMware, Inc. Virtualization manager 107 includes a distributed resource scheduler (DRS). In some embodiments, virtualization manager 107 also includes a migration component that performs migration of VCIs between hosts 110, such as by live migration.

Host(s) 110, including host 110a, host 110b, and host 100c, may be communicatively connected to data network 156 and management network 108. Data network 156 and management network 108 are physical or "underlay" networks, and may be separate physical networks or the same physical network but logically isolated, e.g., using separate VLANs. For example, the underlay network including data network 156 and management network 108 may be referred to as underlay network 156/108. As used herein, the term "underlay" is synonymous with "physical" and refers to physical components of networking environment 100. As used herein, the term "overlay" may be used synonymously with "logical" and refers to the logical network implemented at least partially within networking environment 100. In some implementations, the underlay network 156/108 is a public cloud network, which itself may include an indirection layer but for the purpose of this description, is treated as a physical network underlay.

Host(s) 110 may be geographically co-located servers on the same rack or on different racks in any arbitrary location in the data center. Host(s) 110 may be configured to provide a virtualization layer, also referred to as a hypervisor 122, that abstracts processor, memory, storage, and networking resources of a hardware platform (not shown) into multiple virtual machines, VM(s). In alternate embodiments, hosts maintain a plurality of VCIs comprising namespace containers, such as Docker containers, running directly on the operating system of the host, or within VMs running on the host.

In some embodiments, an agent on a host 110 hypervisor (e.g., a cloud manager) responsible for the programming of the overlay. The agent programs virtual routers on the host 110. An agent on a management VM 112 programs routes in underlay network 156 for management VM 112. The agent on management VM 112 programs the routes using an API call to API endpoint 160 (e.g., an API server) that manages underlay network 156 for each route.

Hypervisor 122 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 122 may comprise system level software as well as a "Domain 0" or "Root Partition" virtual machine (not shown) which is a privileged machine that has access to the physical hardware resources of the host. In this implementation, one or more of a virtual switch, virtual router, tunnel endpoint (TEP), etc., along with hardware drivers, may reside in the privileged virtual machine. Although parts of the disclosure are described with reference to VMs, the teachings herein also apply to other types of VCIs, such as containers, Docker containers, data compute nodes, isolated user space instances, namespace containers, and the like.

Host(s) 110 may be constructed on a server grade hardware platform (not shown), such as an x86 architecture platform. The hardware platform of a host 110 may include components of a computing device such as one or more processors (CPUs), system memory, one or more network interfaces (e.g., PNICs, HNI 152), storage system, and other components (not shown). A CPU is configured to execute instructions, for example, executable instructions that perform one or more operations described herein and that may be stored in the memory and storage system. The network interface(s) enable host 110 to communicate with other devices via a physical network, such as management network 108, underlay network 156, and/or external network 158.

Host network interfaces (HNI) 152 may be software defined network interfaces provided by the cloud provider and addressable on the underlay network 156/108. An HNI 152 is bound to one or more IP address of the underlay network 156/108. Different HNIs may each be associated with a different VLAN. Each HNI 152 may be associated with an entry in a routing table for the underlay. HNI 152 may be coupled to a logical switch implemented by a virtual switch 130 running on a host 110. HNI 152 may be bound to multiple IP addresses. Though not shown, in certain embodiments, HNIs 152 are also coupled to management network 108.

Hypervisor 122 includes a virtual switch 130, a TEP 138, and virtual router(s) 126. Hypervisor 122 may also include an agent process running on hypervisor 122 that programs overlay routers on host 110.

Virtual switch 130 serves as a software-based interface between HNI(s) 152 and VMs, such as management VMs 112, running on host 110. Virtual switch 130 may be a virtual distributed switch (VDS). A VDS functions as a single virtual switch managed across multiple hosts 110. Virtual router(s) 126 route traffic for a respective host 110.

Figure 3:
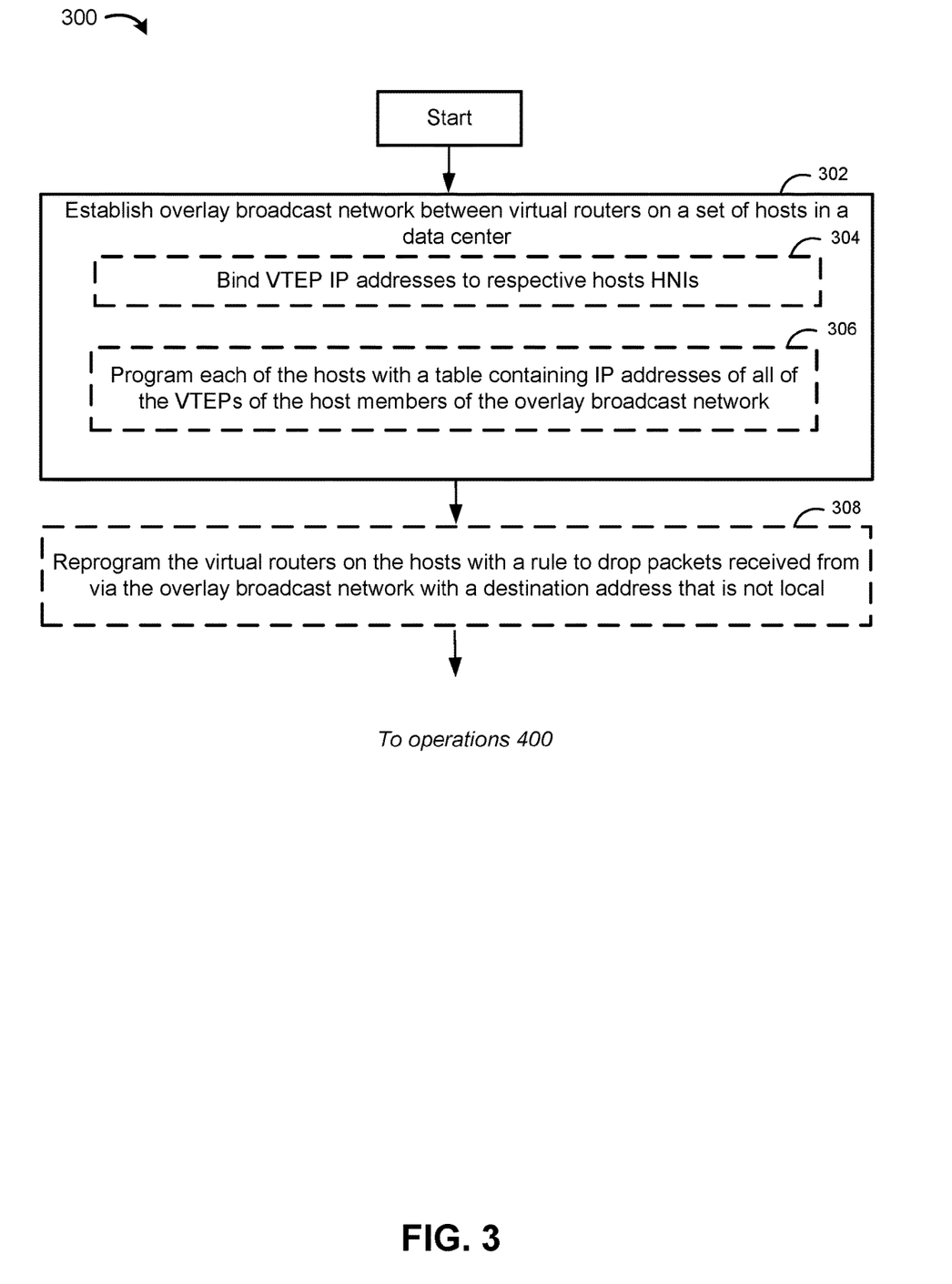
FIG. 3 depicts a flowchart of example operations for establishing an overlay broadcast network, according to one or more embodiments.

According to certain embodiments, an overlay broadcast network is created. FIG. 3 depicts a flowchart of example operations 300 for establishing an overlay broadcast network, according to one or more embodiments. FIG. 3 may be understood with reference to FIG. 1A and FIG. 1B.

At block 302, operations 300 include establishing an overlay broadcast network between virtual routers on a set of hosts in a data center. The overlay broadcast network may be pre-created (i.e., prior to transferring underlay VMs between hosts) and connected to each of the virtual routers of the set of hosts. For example, creating the overlay broadcast network includes, at block 304, binding the IP addresses of TEPs of each of the hosts included in the overlay broadcast network, such as TEP 138a with IP address 10.2.48.4, TEP 138b with IP address 10.2.48.5, and TEP 138c with IP address 10.2.48.6 to HNI 152a, 152b, and 152c of hosts 110a, 110b, and 110c, respectively, by programming underlay routing table 157 of underlay network 156/108 with mappings of the IP addresses of TEPs 138a, 138b, and 138c to HNIs 152a, 152b, and 152c, respectively. Creating the overlay broadcast network also includes, at block 306, programming each of the hosts included in the overlay broadcast network, such as hosts 110a, 110b, and 110c, with an overlay broadcast network membership table containing the IP addresses of the TEPs of each of the hosts, such as TEPs 138a, 138b, and 138c, in the overlay broadcast network and a logical network identifier (VNI) associated with the overlay broadcast network. The hosts included in the overlay broadcast network, such as hosts 110a, 110b, and 110c, are also programmed with an overlay broadcast network IP address (100.64.10.1) associated with the overlay broadcast network.

In certain embodiments, initially, for each management VM 112, the routing table 127 of a virtual router 126 on a host 110 may route packets with the IP address of the management VM 112 to a default router 162 on management network 108 if the management VM 112 is not on the same host 110, or may route the packets to the management VM 112 if the management VM 112 is on the same host 110. Thus, if a virtual router 126 receives a packet for a management VM 112 not on the same host as the virtual router 126, the virtual router 126 routes the packet to underlay network 156/108 via HNI 152. Underlay routing table 157 may be programmed to route the packet to the HNI 152 associated with host 110 on which the management VM 112 is running.

At optional block 308, virtual routers on the set of hosts included in the overlay broadcast network, such as virtual routers 126a, 126b, and 126c are configured with a rule (e.g., routing policy) to prevent virtual routers 126a, 126b, and 126c from forwarding a packet that is received from the overlay broadcast network back to underlay network 156/108, such as to prevent looping as further discussed herein. For example, in certain embodiments, the rule indicates that packets received at a virtual router 126 should be dropped when: 1) they are received at the virtual router 126 over the uplink, meaning from underlay network 156/108, 2) they have a source IP address associated with a source endpoint, such as API endpoint 160, for which traffic is forwarded over the overlay broadcast network, and 3) they have a destination IP address that is not on the same host 110 as the virtual router 126. As shown, routing tables 127a, 127b, and 127c, are programmed with a policy to drop packets received on the overlay broadcast network with a destination that is not local. Any suitable routing policy may be used that prevent packets received on the overlay broadcast network from being forwarded to underlay network 156/108.

Figure 1B:
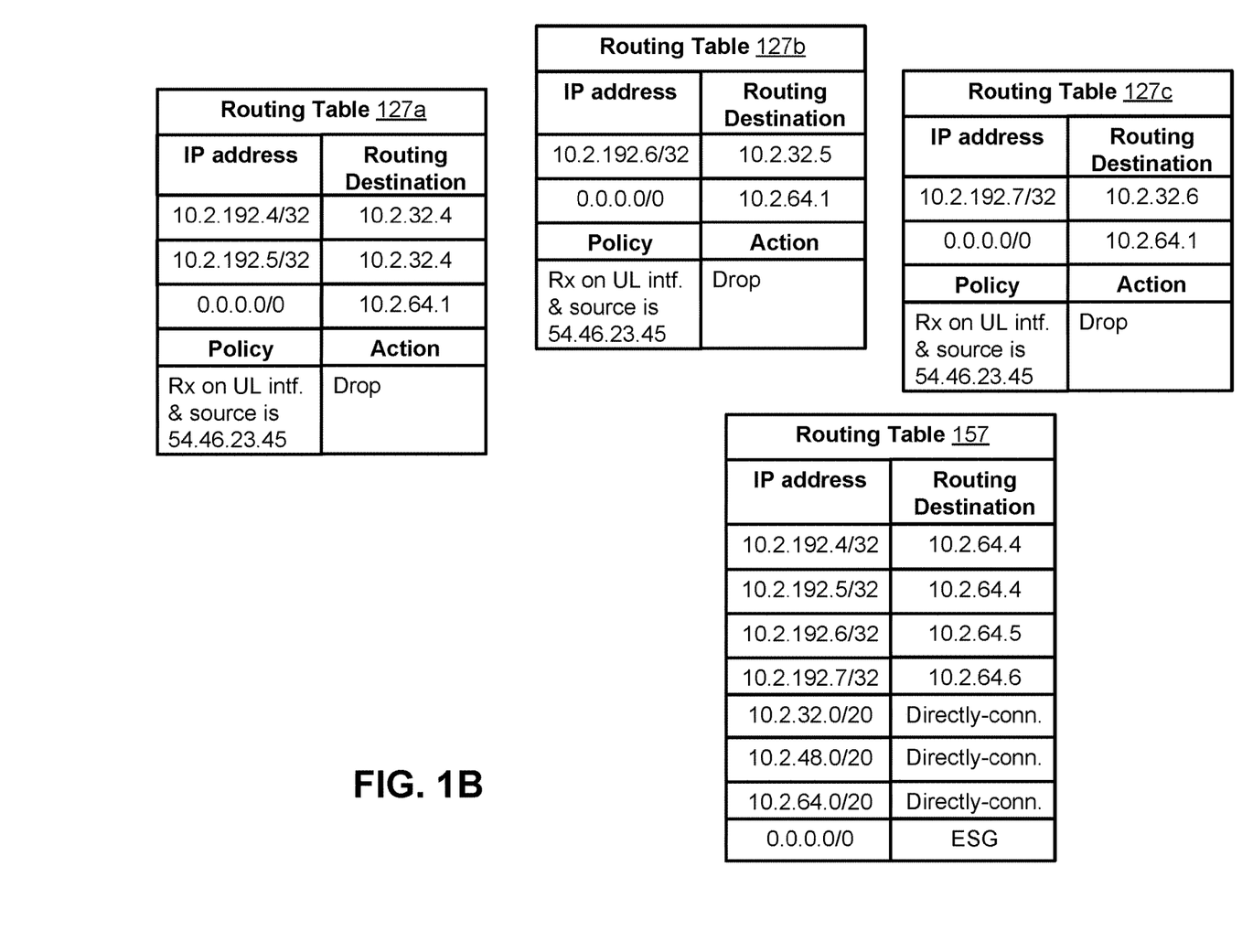
FIG. 1B depicts example routing tables for virtual routers of the first host, the second host, the third host, and the underlay network of FIG. 1, according to one or more embodiments.

FIG. 1B illustrates routing tables 127a, 127b, and 127c for virtual routers 126a, 126b, and 126c on hosts 110a, 110b, and 110c, respectively, and an underlay routing table 157, with example entries before VM $112_1$ moves from host 110a to host 110c. As shown in FIG. 1B, routing table 127a, for virtual router 126a of host 110a on which management VM $112_1$ and management VM $112_2$ are located, is programmed with the IP addresses for management VM $112_1$ (10.2.192.4/32) and management VM $112_2$ (10.2.192.5/32) routed locally within host 110a as indicated by the destination route of the IP local address of the management network (10.2.32.4). Similarly, routing table 127b, for virtual router 126b on host 110b on which management VM $112_3$ is located, is programmed with a local route for the IP address for management VM $112_3$ (10.2.192.6/32), and routing table 127c, for virtual router 126c on host 110c on which management VM $112_4$ is located, is programmed with a local route for the IP address for management VM $112_4$ (10.2.192.7/32). Further, each of routing tables 127a-127c is programmed with a default route, shown as IP address 0.0.0.0/0, with a routing destination to underlay network 156/108, shown as IP address 10.2.64.1. Further, the routing policy to prevent packets received on the overlay broadcast network from being forwarded to underlay network 156/108 is shown implemented as policy "Rx on UL intf. & source is 54.46.23.45" and action "drop." In particular, according to such policy, any packets transmitted (Tx) to the virtual router 126a-126c on the uplink (UL), having a source IP address of API endpoint 160 (54.46.23.45) and for which there is no specific route in the corresponding routing table 127a-127c, are dropped.

Underlay routing table 157 is programmed with a route for management VM $112_1$ (10.2.192.4/32) and management VM $112_2$ (10.2.192.5/32) to HNI 152a (10.2.64.4), a route for management VM $112_3$ (10.2.192.6/32) to HNI 152b (10.2.64.5), and a route for VM $112_4$ (10.2.192.7/32) to HNI 152c (10.2.64.6). Underlay routing table 157 is further programmed for a route for each of TEPs 138a-138c (10.2.48.0/20) to HNIs 152a-152c (directly-connected). Underlay routing table 157 is further programmed for a route for management network 108 to HNIs 152a-152c (directly-connected). Underlay routing table 157 is further programmed with a default route, shown as IP address 0.0.0.0/0, with a routing destination to an edge services gateway that provides access to an external network, such as network 158.

Figure 2A:
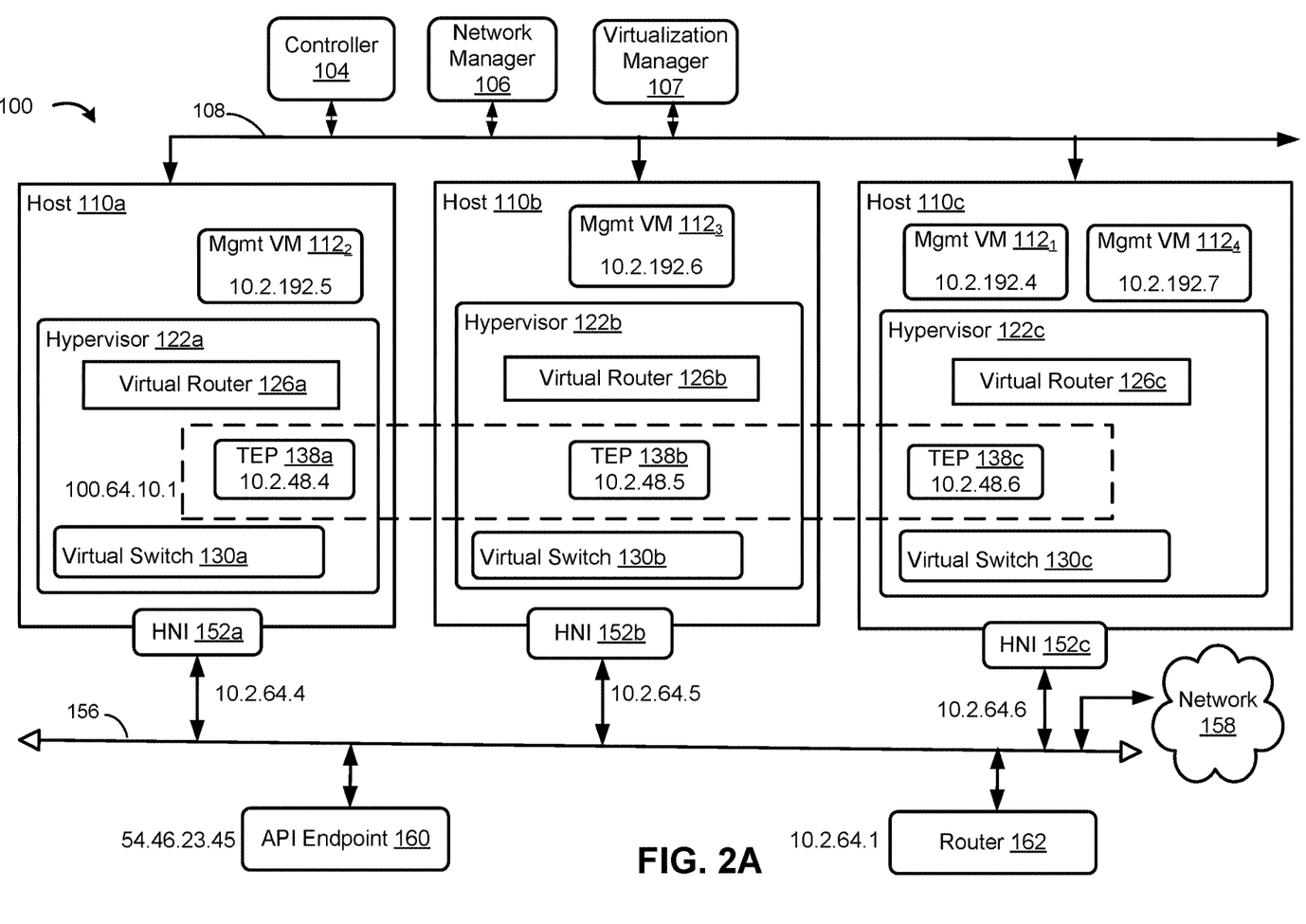
FIG. 2A depicts a block diagram of the first host, the second host, and the third host of FIG. 1 after the first management VM moves to the third host, according to one or more embodiments.

As discussed, a VM 112 can move to a different host 110. For example, in FIG. 1A, host 110a includes a management VM $112_1$ and a management VM $112_2$. In the example illustrated in FIG. 2A, management VM $112_1$ moves from host 110a to host 110c. As shown in FIG. 2A, host 110a may be referred to as the "old host" and host 110c may be referred to as the "new host" after VM $112_1$ moves to host 110c. Hosts that are not the old or the new host, such as host 110b, may be referred to as "other hosts".

Figure 2B:
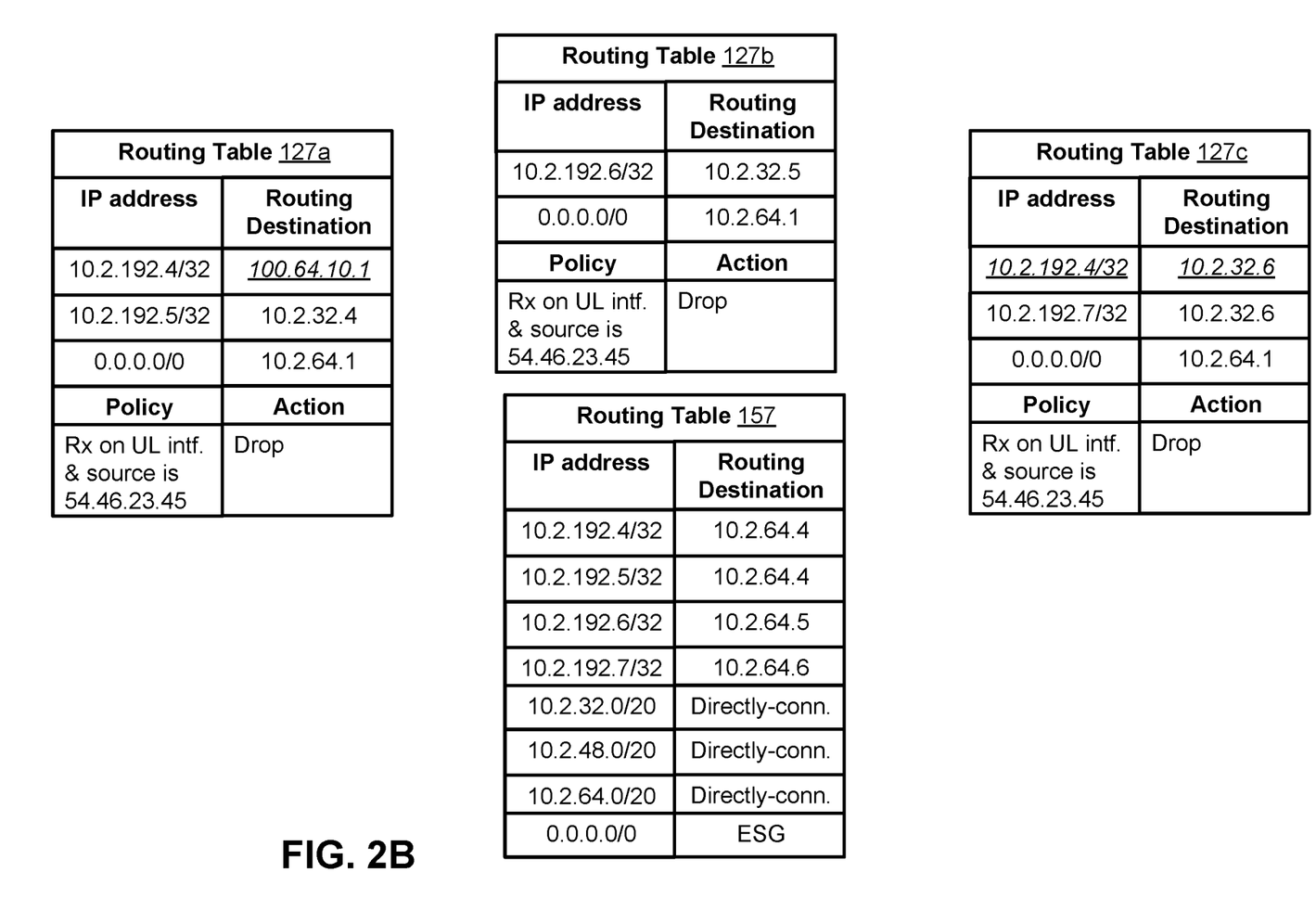
FIG. 2B depicts the example routing tables for the virtual routers of the first host, the second host, the third host, and the underlay network after the first management VM moves to the third host and before updating the underlay network routing table, according to one or more embodiments.

As mentioned above, when a VM moves to a different host, an agent process running in the respective host hypervisor can update routes at a managed virtual router 126 for the VM. In the illustrated example, to update the underlay route for management VM $112_1$ to new host 110c, management VM $112_1$ would communicate with API endpoint 160. This process involves messages exchanged between management VM $112_1$ and API endpoint 160; however, before updating, underlay routing table 157 still maps old host 110a (10.2.64.4) as the routing destination for management VM $112_1$ IP address (10.2.192.4/32), as shown in FIG. 2B. Updating the underlay route may include a handshake exchange between management VM 112₁ and API endpoint 160, however, because underlay routing table 157 still maps old host 110a as the routing destination for management VM 112₁, any messages from API endpoint 160 for management VM 112₁ continue to be sent to old host 110a and management VM 112₁ would not be able to complete the handshake exchange to update its route in routing table 157.

Thus, according to embodiments of the present disclosure, when traffic is received on old host 110a, the traffic is forwarded ("hairpinned") to new host 110c using an overlay broadcast network that spans across hypervisors. The overlay broadcast network may using generic network virtualization encapsulation (GENEVE) tunnels in certain embodiments.

Figure 4:
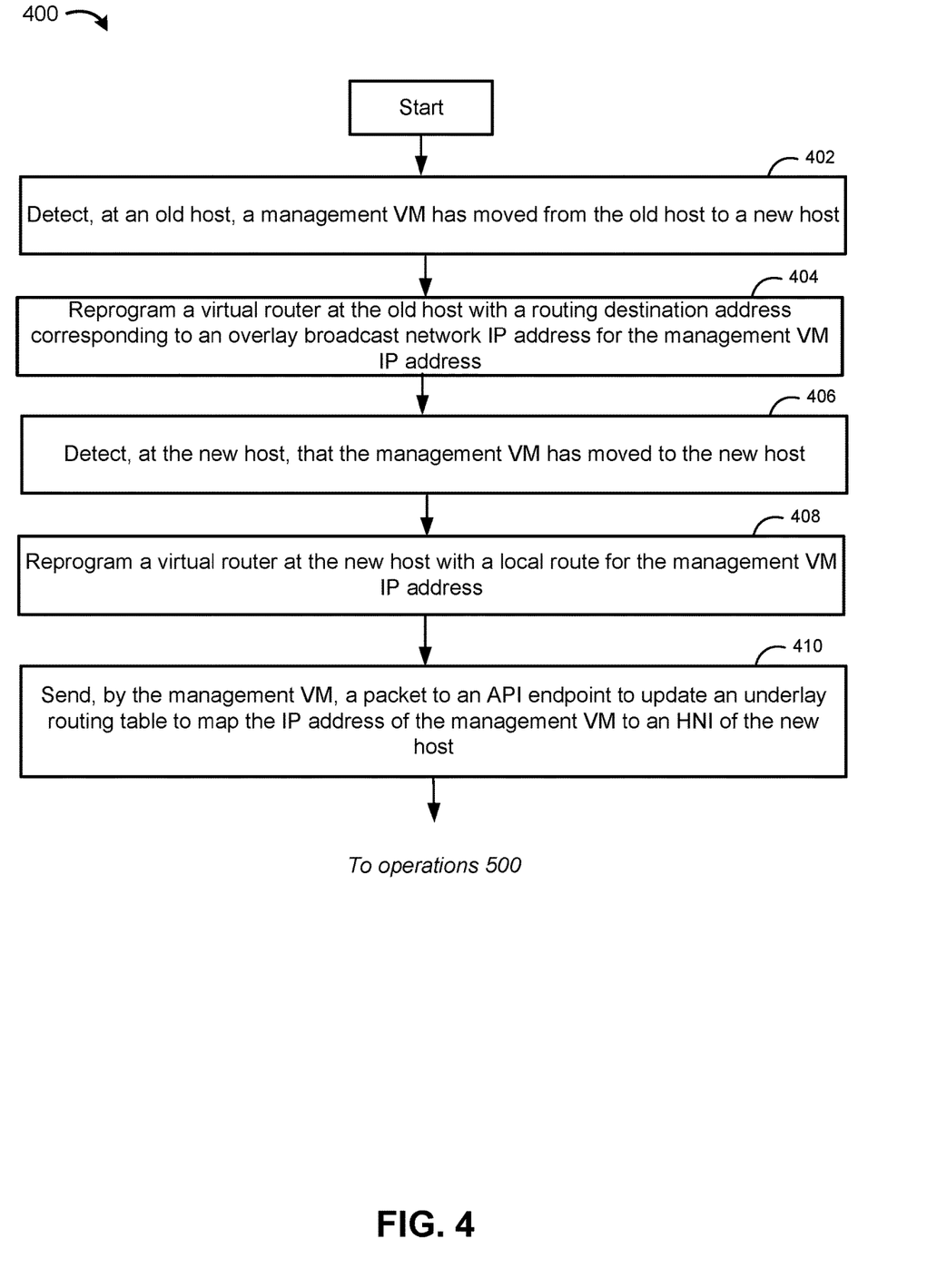
FIG. 4 depicts a flowchart of example operations for updating virtual routers when a management VM moves to a new host, according to one or more embodiments.

FIG. 4 depicts a flowchart of example operations 400 for updating virtual routers when a management VM moves to a new host, according to one or more embodiments. FIG. 4 may be understood with reference to FIG. 2A and FIG. 2B.

At block 402, operations 400 include detecting, at an old host, that a management VM has moved from the old host to a new host. For example, when management VM 112₁ moves to new host 110c, an agent process on old host 110a detects that the port(s) for management VM 112₁ is deleted.

At block 404, operations 400 include reprogramming a virtual router at the old host with a routing destination address for the management VM as an overlay broadcast network IP address. For example, the agent process on hypervisor 122a updates routing table 127a to update the routing destination for management VM 112₁ IP address (10.2.192.4/32) to the overlay broadcast network interface IP address (100.64.10.1), as shown in FIG. 2B.

At block 406, operations 400 include detecting, at the new host, that the management VM has moved to the new host. For example, the agent process on hypervisor 122c detects that a port is added for management VM 112₁.

At block 408, operations 400 include reprogramming a virtual router at the new host with a local route for the management VM IP address. For example, the agent process on hypervisor 122c updates routing table 127c to include a route for management VM 112₁ IP address (10.2.192.4/32) to local route to the management network interface, as shown in FIG. 2B.

At block 410, operations 400 includes sending, by the management VM, a packet to an API endpoint to update an underlay routing table to map the IP address of the management VM to an HNI of the new host. For example, once management VM 112₁ moves to new host 110c, management VM 112₁ (e.g., the agent process running on management VM 112₁) sends a message from new host 110c, via underlay network 156/108, to API endpoint 160 to update underlay routing table 157. The packet will be able to reach API endpoint 160, however, underlay network 156/108 will send the return traffic to VM 112₁ (10.2.192.4/32) from API endpoint 160 to old host 110a (10.2.64.4), as shown in FIG. 2B.

According to the techniques discussed herein, even after the management VM moves to a different host, the management VM is able to communicate with the API endpoint to update its route in the underlay routing table, enabling management VM 112₁ and API endpoint 160 to communicate as described below with respect to FIG. 5.

Figure 5:
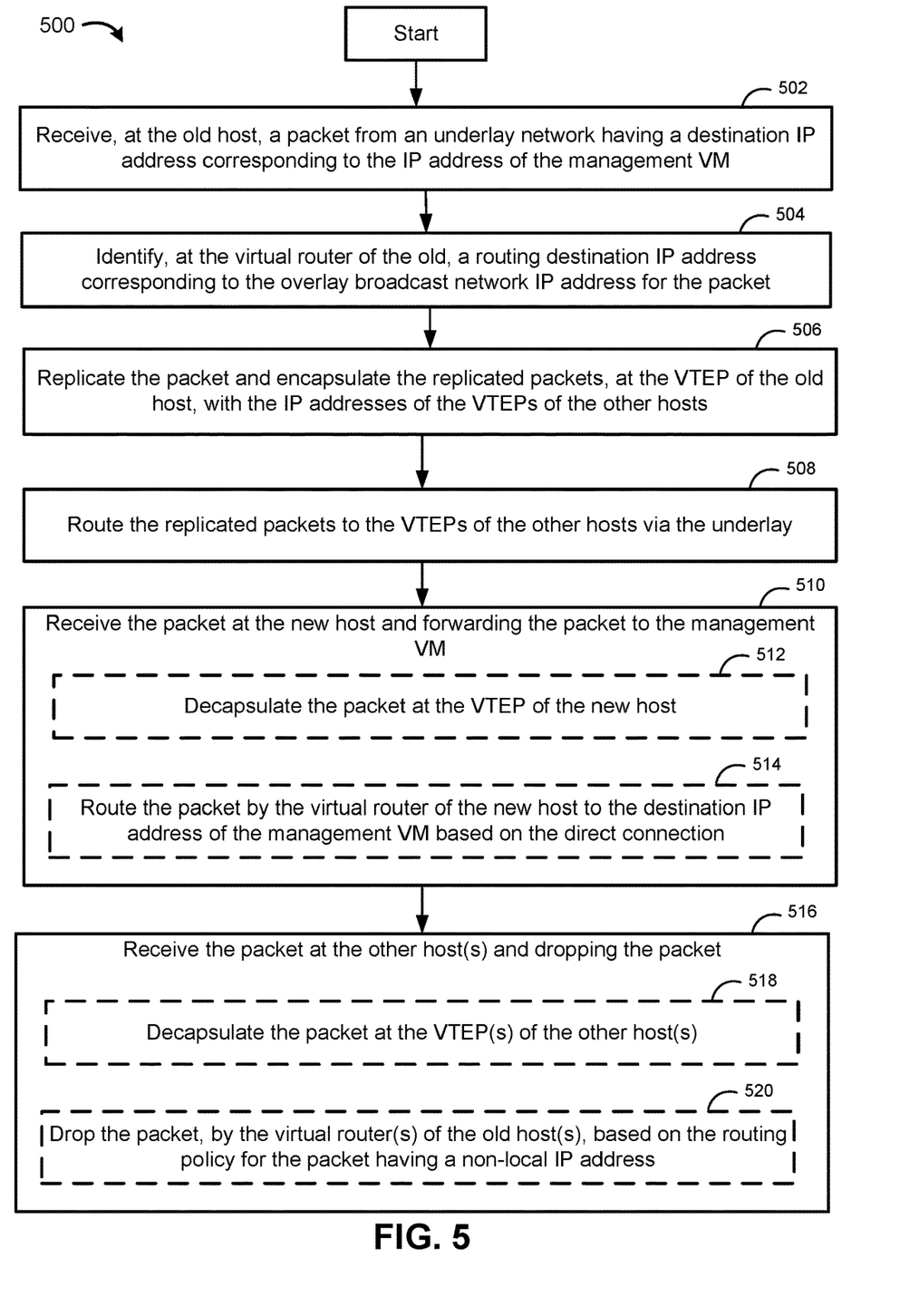
FIG. 5 depicts a flowchart of example operations for broadcasting packets for the management VM received at the old host to enable the management VM to communicate with the API endpoint to update the underlay routing table for the management VM, according to one or more embodiments.

FIG. 5 depicts a flowchart of example operations 500 for broadcasting packets for the management VM received at the old host to enable the management VM to communicate with the API endpoint to update the underlay routing table for the management VM, according to one or more embodiments. FIG. 5 may be understood with reference to FIGS. 2A-2C.

At block 502, operations 500 include receiving, at the old host, a packet from an underlay network having a destination IP address corresponding to the IP address of the management VM. For example, old host 110a receives a return packet from API endpoint 160 via underlay 156 with the return packet having a destination IP address corresponding to the IP address (10.2.192.4/32) of management VM 112₁.

At block 504, operations 500 include identifying, in the routing table of the virtual router on the old host, the overlay broadcast network IP address associated with the IP address of the management VM. For example, virtual router 126a (having been reprogrammed at block 404) includes a destination route address for the destination IP address (10.2.192.4/32) as the IP address of the overlay broadcast network IP address (100.64.10.1) as shown in FIG. 2B.

At block 506, operations 500 include replicating the packet and encapsulating the replicated packets, at the TEP of the old host, with the IP addresses of the TEPs of the other hosts. For example, based on identifying the routing destination for the packet as the overlay broadcast network, host 110a will broadcast the return packet to host 110b and host 110c via the overlay broadcast network. When a packet is sent on the broadcast network by old host 110a, it is sent to all hosts/hypervisors that are connected to this broadcast network, host 110b and host 110c. For example, the overlay broadcast network IP address (100.64.10.1) may resolve to a static ARP entry with a MAC unused on the network, therefore, virtual router 126a treats the packet as a broadcast unknown-unicast and multicast (BUM) packet. Accordingly, virtual router 126a replicates the packet for each host that implements the L2 overlay network implemented by TEP 138a. Virtual router 126a floods the L2 overlay broadcast network by causing TEP 138a to encapsulate each replicated packet with a corresponding destination IP address of a corresponding TEP that is part of the L2 overlay broadcast network. In this case, TEP 138a encapsulates a packet with a destination IP address of TEP 138b in the IP header and a replicated packet with a destination IP address of TEP 138c in the IP header. Host 110a then transmits the packets to the respective TEPs via underlay 156/108.

At block 508, operations 500 include routing the replicated packets to the TEPs of the other hosts via the underlay. For example, underlay routing table 157 includes a mapping of TEP 138b and 138c to HNI 152b and 152c, respectively, as shown in FIG. 2B and as discussed with respect to FIG. 1B.

At block 510, operations 500 include receiving the packet at the new host and forwarding the packet to the management VM. For example, new host 110c receives the replicated return packet forwarded from old host 110a via underlay 156/108 using the overlay broadcast network. At block 512, TEP 138c decapsulates the packet. At block 514, virtual router 126c routes the return packet to management VM 112₁ since routing table 127c has a local route (10.2.32.6) for the IP address (10.2.192.4/32) of management VM 112₁, as shown in FIG. 2B. This establishes the connection path between management VM 112₁ and API endpoint 160.

Figure 2C:
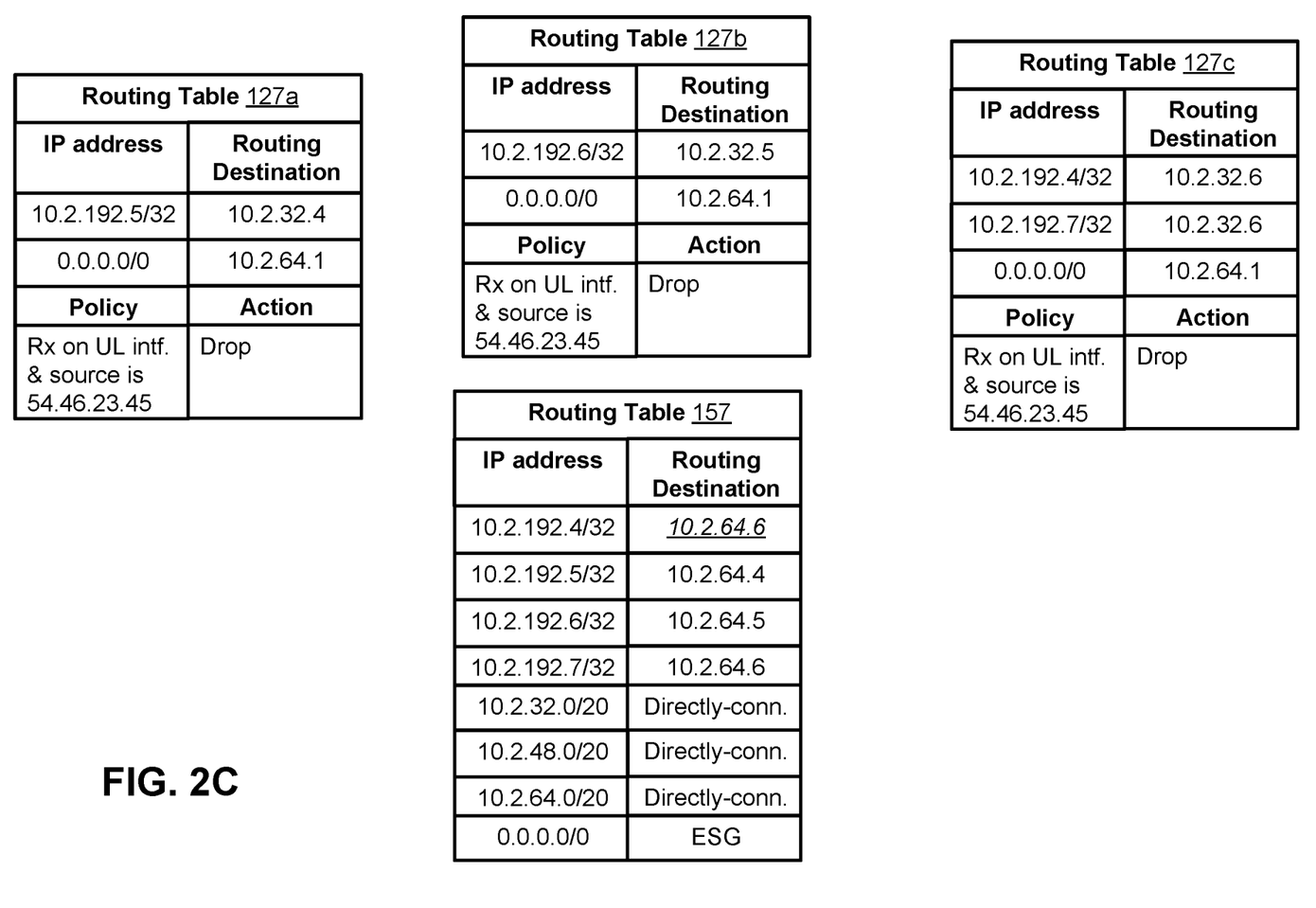
FIG. 2C depicts the example routing tables for the virtual routers of the first host, the second host, the third host, and the underlay network after the first management VM moves to the third host and after updating the underlay network routing table, according to one or more embodiments.

Once API endpoint 160 receives the API call from management VM 112₁, API endpoint 160 updates the route for the IP address (10.2.192.4/32) of management VM 112₁ to point to new host 110c uplink interface (10.2.64.6), as shown in FIG. 2C, and API endpoint 160 and management VM 112₁ can communicate without the overlay broadcast network. In certain embodiments, after a period of time (e.g., a predefined duration), the route for VM $112_1$ pointing to the overlay broadcast network in routing table 127a is removed, as shown in FIG. 2C.

At block 516, operations 500 include receiving the packet at the other hosts and dropping the packet. When other hosts, such as host 110b, receive a packet via the overlay broadcast network, such as the return packet, for management VM $112_1$ from old host 110a, at block 518, TEP 138b of other host 110b decapsulates the packet. At block 520, virtual router 126b of other host 110b drops the packet based on the routing policy for the packet having a non-local IP address. For example, since routing table 127b does not have a route for the IP address (10.2.192.4/32) management VM $112_1$, virtual router 126b without the routing policy would have used its default route to route the packet to underlay 156/108 via its interface, HNI 152b. However, with the routing policy configured, virtual router 126b will instead drop the return packet. This prevents looping. For example, the packet is received with a source IP address 54.46.23.45 of API endpoint 160 over the uplink from underlay network 156/108, and there is no specific route in routing table 127b for the destination IP address (10.2.192.4/32) of the packet, so the packet is dropped by virtual router 126b.

The embodiments described herein provide a technical solution to a technical problem associated with updating the route for a management VM in an underlay routing table when the management VM moves to a new host. More specifically, implementing the embodiments herein allows for creating an overlay broadcast network to forward traffic to the new host 110 even when the underlay sends traffic for the management VM to the old host before the underlay routing table is updated to send the traffic for the management VM to the new host. In some embodiments, a routing policy is configured at the virtual routers of the hosts in the overlay broadcast network to prevent looping.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of updating an underlay network route for a virtual computing instance (VCI) moved from an old host to a new host in a data center, the method comprising:
after activating the VCI on the new host:
reprogramming a first routing table on the old host to associate a first Internet protocol (IP) address of the VCI with an overlay broadcast network IP address of an overlay broadcast network, the overlay broadcast network having been implemented by a plurality of hosts prior to the activating of the VCI on the new host, the plurality of hosts comprising the new host, the old host, and one or more other hosts;
reprogramming a second routing table on the new host to associate the first IP address to a local route on the new host;
sending, from the VCI to an application programming interface (API) endpoint, a message to initiate reprogramming of an underlay network route in a routing table of an underlay network to associate the first IP address to a network interface of the new host;
receiving from the underlay network, at the old host, a packet having a destination address corresponding to the first IP address, the packet comprising a response packet from the API endpoint to the VCI; and
based on the first routing table associating the first IP address with the overlay broadcast network IP address, broadcasting the packet to the new host and the one or more other hosts via the overlay broadcast network.

2. The method of claim 1, wherein broadcasting the packet to the new host and the one or more other hosts via the overlay broadcast network comprises:
replicating, by a first tunnel endpoint of the old host, the packet for each of the one or more other hosts and the new host;
encapsulating, by the first tunnel endpoint, for each of the one or more other hosts and the new host, the respective replicated packet with an outer header having a destination address corresponding to an IP address of a corresponding tunnel endpoint of the respective host; and
transmitting, via the underlay network, for each of the one or more other hosts and the new host, the respective encapsulated packet to the corresponding tunnel endpoint of the respective host.

3. The method of claim 1, further comprising:
prior to activating the VCI on the new host:
programming a routing table of the underlay network to associate, for each of the plurality of hosts, a respective IP address of the corresponding tunnel endpoint with a corresponding network interface of the respective host, wherein:
the underlay network routes the encapsulated packets based on the routing table of the underlay network.

4. The method of claim 3, further comprising:
receiving, at the corresponding tunnel endpoint of the new host, the respective encapsulated packet from the old host via the underlay network;
decapsulating the encapsulated packet, at the corresponding tunnel endpoint of the new host; and
forwarding the packet, by a virtual router on the new host, to the VCI on the new host based on the packet having the destination address corresponding to the first IP address and the second routing table associating the first IP address to the local route on the new host.

5. The method of claim 1, further comprising:
configuring a corresponding virtual router at each of the plurality hosts with a routing policy to prevent the host from forwarding packets received from the underlay network on the overlay broadcast network back to the underlay network.

6. The method of claim 5, further comprising:
after activating the VCI on the new host:
receiving, at each of the one or more other hosts, the respective encapsulated packet;
decapsulating, by the corresponding tunnel endpoint of each of the one or more other hosts, the respective encapsulated packet; and
dropping the packet, by the corresponding virtual router of each of the one or more other hosts, based on the routing policy.

7. The method of claim 6, wherein the routing policy configures the corresponding virtual router at each of the plurality hosts to drop any packet received via the underlay network, having a destination address not local to the host, and having a source address of an endpoint configured to program a routing table of the underlay network.

8. A non-transitory computer readable medium comprising instructions that, when executed by one or more processors of a computing system, cause the computing system to perform a method for updating an underlay network route for a virtual computing instance (VCI) moved from an old host to a new host in a data center, the method comprising:
after activating the VCI on the new host:
reprogramming a first routing table on the old host to associate a first Internet protocol (IP) address of the VCI with an overlay broadcast network IP address of an overlay broadcast network, the overlay broadcast network having been implemented by a plurality of hosts prior to the activating of the VCI on the new host, the plurality of hosts comprising the new host, the old host, and one or more other hosts;
reprogramming a second routing table on the new host to associate the first IP address to a local route on the new host;

sending, from the VCI to an application programming interface (API) endpoint, a message to initiate reprogramming of an underlay network route in a routing table of an underlay network to associate the first IP address to a network interface of the new host;

receiving from the underlay network, at the old host, a packet having a destination address corresponding to the first IP address, the packet comprising a response packet from the API endpoint to the VCI; and based on the first routing table associating the first IP address with the overlay broadcast network IP address, broadcasting the packet to the new host and the one or more other hosts via the overlay broadcast network.

9. The non-transitory computer readable medium of claim 8, wherein broadcasting the packet to the new host and the one or more other hosts via the overlay broadcast network comprises:

replicating, by a first tunnel endpoint of the old host, the packet for each of the one or more other hosts and the new host;

encapsulating, by the first tunnel endpoint, for each of the one or more other hosts and the new host, the respective replicated packet with an outer header having a destination address corresponding to an IP address of a corresponding tunnel endpoint of the respective host; and transmitting, via the underlay network, for each of the one or more other hosts and the new host, the respective encapsulated packet to the corresponding tunnel endpoint of the respective host.

10. The non-transitory computer readable medium of claim 8, the method further comprising:

prior to activating the VCI on the new host:

programming a routing table of the underlay network to associate, for each of the plurality of hosts, a respective IP address of the corresponding tunnel endpoint with a corresponding network interface of the respective host, wherein:

the underlay network routes the encapsulated packets based on the routing table of the underlay network.

11. The non-transitory computer readable medium of claim 10, the method further comprising:

receiving, at the corresponding tunnel endpoint of the new host, the respective encapsulated packet from the old host via the underlay network;

decapsulating the encapsulated packet, at the corresponding tunnel endpoint of the new host; and forwarding the packet, by a virtual router on the new host, to the VCI on the new host based on the packet having the destination address corresponding to the first IP address and the second routing table associating the first IP address to the local route on the new host.

12. The non-transitory computer readable medium of claim 8, the method further comprising:

configuring a corresponding virtual router at each of the plurality hosts with a routing policy to prevent the host from forwarding packets received from the underlay network on the overlay broadcast network back to the underlay network.

13. The non-transitory computer readable medium of claim 12, the method further comprising:

after activating the VCI on the new host:

receiving, at each of the one or more other hosts, the respective encapsulated packet;

decapsulating, by the corresponding tunnel endpoint of each of the one or more other hosts, the respective encapsulated packet; and dropping the packet, by the corresponding virtual router of each of the one or more other hosts, based on the routing policy.

14. The non-transitory computer readable medium of claim 13, wherein the routing policy configures the corresponding virtual router at each of the plurality hosts to drop any packet received via the underlay network, having a destination address not local to the host, and having a source address of an endpoint configured to program a routing table of the underlay network.

15. A system comprising one or more processors and a non-transitory computer readable medium, wherein the non-transitory computer readable medium comprises instructions that, when executed by the one or more processors, cause the system to perform a method for updating an underlay network route for a virtual computing instance (VCI) moved from an old host to a new host in a data center, the method comprising:

after activating the VCI on the new host:

reprogramming a first routing table on the old host to associate a first Internet protocol (IP) address of the VCI with an overlay broadcast network IP address of an overlay broadcast network, the overlay broadcast network having been implemented by a plurality of hosts prior to the activating of the VCI on the new host, the plurality of hosts comprising the new host, the old host, and one or more other hosts;

reprogramming a second routing table on the new host to associate the first IP address to a local route on the new host;

sending, from the VCI to an application programming interface (API) endpoint, a message to initiate reprogramming of an underlay network route in a routing table of an underlay network to associate the first IP address to a network interface of the new host;

receiving from the underlay network, at the old host, a packet having a destination address corresponding to the first IP address, the packet comprising a response packet from the API endpoint to the VCI; and based on the first routing table associating the first IP address with the overlay broadcast network IP address, broadcasting the packet to the new host and the one or more other hosts via the overlay broadcast network.

16. The system of claim 15, wherein broadcasting the packet to the new host and the one or more other hosts via the overlay broadcast network comprises:

replicating, by a first tunnel endpoint of the old host, the packet for each of the one or more other hosts and the new host;

encapsulating, by the first tunnel endpoint, for each of the one or more other hosts and the new host, the respective replicated packet with an outer header having a destination address corresponding to an IP address of a corresponding tunnel endpoint of the respective host; and transmitting, via the underlay network, for each of the one or more other hosts and the new host, the respective encapsulated packet to the corresponding tunnel endpoint of the respective host.

17. The system of claim 15, the method further comprising:

prior to activating the VCI on the new host:

programming a routing table of the underlay network to associate, for each of the plurality of hosts, a respective IP address of the corresponding tunnel endpoint with a corresponding network interface of the respective host, wherein:

the underlay network routes the encapsulated packets based on the routing table of the underlay network.

18. The system of claim 17, the method further comprising:

receiving, at the corresponding tunnel endpoint of the new host, the respective encapsulated packet from the old host via the underlay network;

decapsulating the encapsulated packet, at the corresponding tunnel endpoint of the new host; and forwarding the packet, by a virtual router on the new host, to the VCI on the new host based on the packet having the destination address corresponding to the first IP address and the second routing table associating the first IP address to the local route on the new host.

19. The system of claim 15, the method further comprising:

configuring a corresponding virtual router at each of the plurality hosts with a routing policy to prevent the host from forwarding packets received from the underlay network on the overlay broadcast network back to the underlay network.

20. The system of claim 19, the method further comprising:

after activating the VCI on the new host:

receiving, at each of the one or more other hosts, the respective encapsulated packet;

decapsulating, by the corresponding tunnel endpoint of each of the one or more other hosts, the respective encapsulated packet; and dropping the packet, by the corresponding virtual router of each of the one or more other hosts, based on the routing policy.

* * * * *